(12) United States Patent
Iacovoni et al.

(10) Patent No.: US 10,173,493 B2
(45) Date of Patent: Jan. 8, 2019

(54) AIR EXTRACTOR SYSTEM TO MITIGATE VACUUM-EFFECT IN A PASSENGER COMPARTMENT OF A MOTOR VEHICLE

(71) Applicant: FORD GLOBAL TECHNOLOGIES, LLC, Dearborn, MI (US)

(72) Inventors: Donald P. Iacovoni, Plymouth, MI (US); Howard Paul Tsvi Linden, Southfield, MI (US); Paul L. Heirtzler, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 14/959,399

(22) Filed: Dec. 4, 2015

(65) Prior Publication Data

US 2017/0158021 A1  Jun. 8, 2017

(51) Int. Cl.
*B60H 1/00* (2006.01)
*B60H 1/24* (2006.01)

(52) U.S. Cl.
CPC ..... *B60H 1/00842* (2013.01); *B60H 1/00835* (2013.01); *B60H 1/00849* (2013.01); *B60H 1/00857* (2013.01); *B60H 1/249* (2013.01)

(58) Field of Classification Search
CPC ............ B60H 1/00828; B60H 1/00835; B60H 1/00842
USPC ...................................... 454/70, 75
See application file for complete search history.

(56) References Cited

U.S. PATENT DOCUMENTS

| | | | |
|---|---|---|---|
| 3,805,684 A | 4/1974 | Atkinson | |
| 5,391,111 A | 2/1995 | Girard et al. | |
| 6,207,447 B1* | 3/2001 | Gould | C05F 17/027 435/290.1 |
| 6,332,330 B1 | 12/2001 | Loup et al. | |
| 6,748,308 B2* | 6/2004 | Losey | B60J 7/0573 236/49.3 |
| 8,613,229 B2 | 12/2013 | Bean, Jr. et al. | |
| 2008/0220710 A1* | 9/2008 | Nonnenmacher | B60H 1/00978 454/75 |
| 2010/0001127 A1 | 1/2010 | Petrac | |
| 2010/0099346 A1* | 4/2010 | Browne | F16K 17/003 454/70 |
| 2013/0095738 A1 | 4/2013 | Marleau et al. | |

(Continued)

FOREIGN PATENT DOCUMENTS

DE  202010014771 U1  3/2012
GB       1258396 A  12/1971

OTHER PUBLICATIONS

English machine translation of DE202010014771U1.

*Primary Examiner* — Steven B McAllister
*Assistant Examiner* — Ko-Wei Lin
(74) *Attorney, Agent, or Firm* — Jason Rogers; King & Schickli, PLLC

(57) ABSTRACT

An air extraction system is provided for a motor vehicle. That air extraction system includes an air extractor having an air flow control valve and an actuator operatively connected to the air flow control valve. Further the system includes a controller configured to activate the actuator and open the air flow control valve when a closure of the motor vehicle is opened thereby mitigating a vacuum-effect otherwise created in the passenger cabin of the motor vehicle. Such a system is particularly effective in mitigating moon roof draw down on moon roof equipped motor vehicles. A related method is also provided.

16 Claims, 4 Drawing Sheets

(56) References Cited

U.S. PATENT DOCUMENTS

2014/0273786 A1\* 9/2014 Wade ................. B60H 1/00828
    454/75
2014/0273798 A1\* 9/2014 Banks .................... F24F 13/14
    454/256

\* cited by examiner

AIR EXTRACTOR SYSTEM TO MITIGATE VACUUM-EFFECT IN A PASSENGER COMPARTMENT OF A MOTOR VEHICLE

TECHNICAL FIELD

This document relates generally to the motor vehicle equipment field and, more particularly, to an air extraction system for a motor vehicle adapted to mitigate a vacuum-effect otherwise created in a passenger compartment or cabin of a motor vehicle when a closure of the motor vehicle is opened.

BACKGROUND

The interior or passenger compartment of today's motor vehicles is effectively sealed from the outside atmosphere in order to allow for more efficient cooling, heating and air conditioning performance. As a result, when a door on such a motor vehicle is closed, there can be a momentary increase in the air pressure in the passenger compartment often resulting in an undesirable increase in the force or effort required to close the door.

It is also known in the art to equip motor vehicles with air extractors to equalize air pressure between the passenger compartment and the outside atmosphere when a door is closed to overcome this problem. Such an air extractor system incorporating a powered diaphragm is disclosed in, for example, U.S. Patent Application Publication 2013/0095738, assigned to Ford Global Technologies, LLC.

More recently, large "open sky" moon roof systems are being offered on certain motor vehicles. It has been found that the moon roof panel of such a system may deflect downward when a motor vehicle door is opened and a vacuum-effect is created in the passenger compartment or cabin of the motor vehicle. Significantly, to date state of the art air extractor systems have not been adapted or configured to address this issue.

This document relates to a new and improved air extraction system for a motor vehicle adapted or configured to mitigate the vacuum-effect otherwise created in a passenger compartment of a motor vehicle when a closure of the motor vehicle is opened. Advantageously, such a device also mitigates in-cabin pressure throb/Helmholtz resonance when a single closure of the motor vehicle, such as a window or moon roof is opened. Accordingly, the air extraction system, and related method disclosed herein represent a significant advance in the art.

SUMMARY

In accordance with the purposes and benefits described herein, an air extraction system is provided for motor vehicle. That air extraction system comprises an air extractor including an air flow control valve, an actuator operatively connected to the air flow control valve and a controller. The controller is configured to activate the actuator and open the air flow control valve when a closure of the motor vehicle is opened thereby mitigating a vacuum-effect otherwise created in a passenger compartment of the motor vehicle.

The air flow control valve may comprise a flap that is displaceable between an opened position and a closed position. Further the actuator may comprise a linear actuator.

The controller may be configured to include a data input respecting opened/closed status of the closure. That data input may be connected to a door ajar switch associated with the closure. Alternatively, that data input may be connected to an electronic latch control module associated with the closure. In still another alternative, the data input may be connected to an electronic actuator for opening and closing the closure.

In one possible embodiment, the controller is configured to include a second data input respecting open/closed status of windows of the motor vehicle. In such an embodiment, the controller may be configured to open the air flow control valve when only one window of the motor vehicle is opened. In still another embodiment, the controller is configured to open the air flow control valve when the moon roof of the motor vehicle is closed and a closure of the motor vehicle is opened, thereby mitigating the vacuum-effect in the passenger cabin of the motor vehicle and eliminating moon roof draw down.

Still further, the controller may be configured to open the air flow control valve when a moon roof of the motor vehicle is opened and all other windows of the motor vehicle are closed. This may be done to mitigate air pressure throb in the passenger compartment when the motor vehicle is in motion.

In accordance with an additional aspect, an air extractor is provided including an air flow control valve, a controller and an actuator responsive to the controller to open the air flow control valve. The air flow control valve opens passively to release positive air pressure from a passenger compartment of the motor vehicle and opens actively by means of the actuator to mitigate negative air pressure in the passenger compartment of the motor vehicle.

In accordance with yet another aspect, a method is provided for mitigating a vacuum-effect created in a passenger compartment of the motor vehicle when a motor vehicle closure is opened. That method may be broadly described as comprising the opening of an air extractor to allow passage of air through the air extractor into the passenger compartment as the motor vehicle closure is opened.

Further, that method may include the step of sensing, by a first device, the opening of the closure and opening, by a second device, an air flow control valve of the air extractor to allow the passage of air from the ambient environment into the passenger cabin. Further the method may include the step of eliminating draw down of a closed moon roof of the motor vehicle by mitigating the vacuum-effect. In accordance with still another aspect, a method is provided for mitigating air pressure throb in a motor vehicle when a closure of the motor vehicle is opened and the motor vehicle is in motion. That method may be broadly described as comprising opening an air flow control valve of an air extractor of the motor vehicle to mitigate in-cabin pressure throb (e.g., Helmholtz resonance). Further that method may include the step of sensing, by a first device, when a single closure of the motor vehicle is opened and opening, by a second device, the air flow control valve in response.

In another embodiment the method includes sensing, by a first device, when a moon roof of the motor vehicle is opened and windows of the motor vehicle are closed and opening, by a second device the air flow control valve.

In accordance with another aspect, the method may include the step of sensing, by means of a sensor, pressure throb in a passenger compartment of the motor vehicle as well as the step of opening, by a device, the air flow control valve in response.

In the following description, there are shown and described several preferred embodiments of the air extraction system. As it should be realized, the air extraction system is capable of other, different embodiments and its several details are capable of modification in various, obvious aspects all without departing from the air extraction system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the air extraction system and together with the description serve to explain certain principles thereof. In the drawing figures.

Reference will now be made in detail to the present preferred embodiments of the air extraction system, examples of which are illustrated in the accompanying drawing figures.

DETAILED DESCRIPTION

Figure 1:
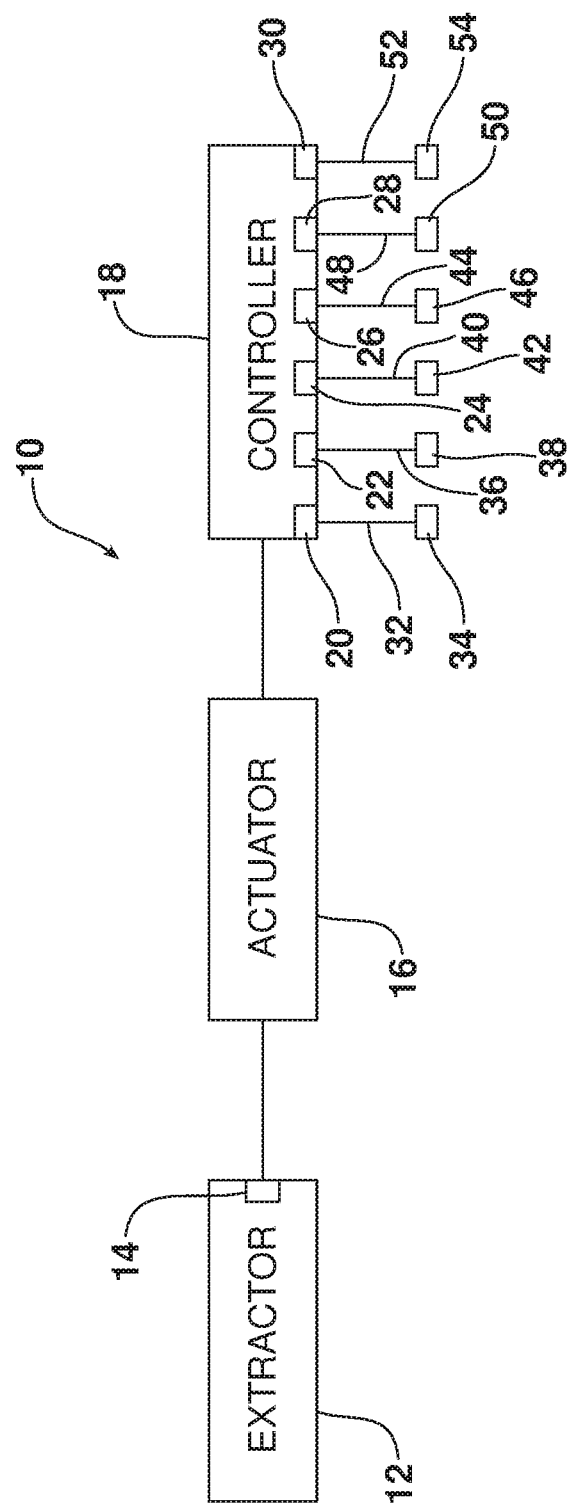
FIG. 1 is a schematic block diagram of the air extraction system.

Reference is now made to FIGS. 1-4 illustrating the air extraction system 10. As schematically illustrated in FIG. 1 that air extraction system 10 comprises an air extractor 12 including an air flow control valve 14, an actuator 16, operatively connected to the air flow control valve 14, and a controller 18.

The controller 18 is a computing device and may comprise, for example, a dedicated microprocessor or an electronic control unit (ECU) operating in accordance with appropriate control software instructions. Any such controller 18 may comprise one or more processors, one or more memories and one or more network interfaces communicating with each other over a communication bus.

As illustrated in FIG. 1, the controller 18 includes a number of data inputs 20, 22, 24, 26, 28, 30. In the illustrated embodiment, data input 20 is connected via data line 32 to a sensor, controller or other device 34 providing data respecting opened/closed status of a first closure of the motor vehicle. The data input 22 is connected via data line 36 to a sensor, control module or other device 38 providing data respecting the opened/closed status of a second closure of the motor vehicle.

Data input 24 is connected via data line 40 to a sensor, control module or other device 42 providing data respecting the opened/closed status of a third closure of a motor vehicle. Similarly data input 26 is connected via data line 44 to a sensor, control module or other device 46 providing data respecting the opened/closed status of a fourth closure of the motor vehicle.

Data input 28 is connected via data line 48 to a sensor, control module or other device 50 providing data respecting the opened/closed status of a moon roof of the motor vehicle.

Data input 30 may be connected via data line 52 to a pressure sensor, control module or other device 54 providing data respecting air pressure of the passenger compartment or cabin of the motor vehicle.

Figure 2:
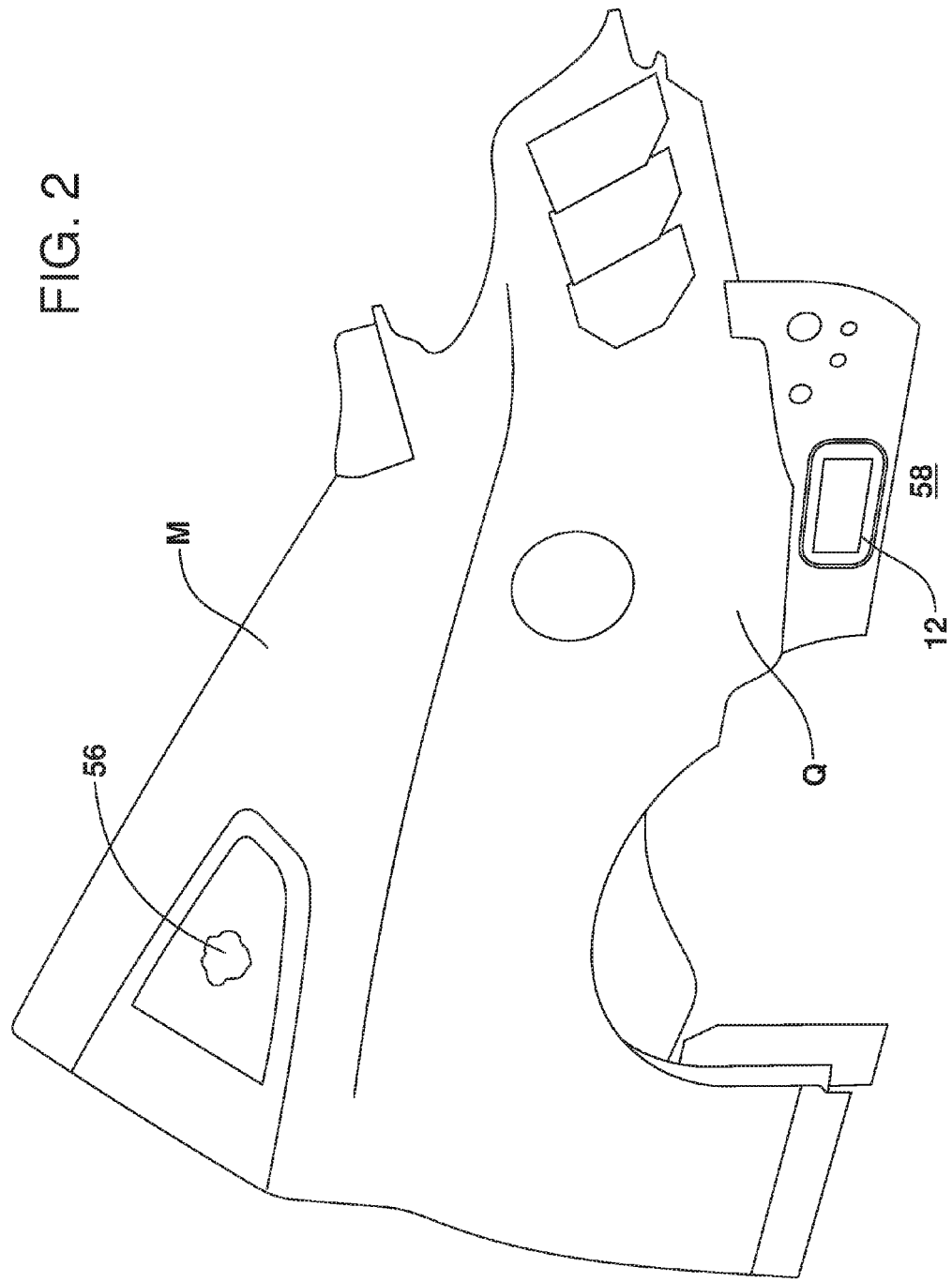
FIG. 2 is a fragmentary perspective view illustrating one possible location for an air extractor on a motor vehicle.

Reference is now made to FIG. 2 illustrating a rear quarter Q of a motor vehicle M where the air extractor 12 may be located to equalize the pressure between the interior compartment of the motor vehicle 56 and the ambient environment 58.

Figure 3:
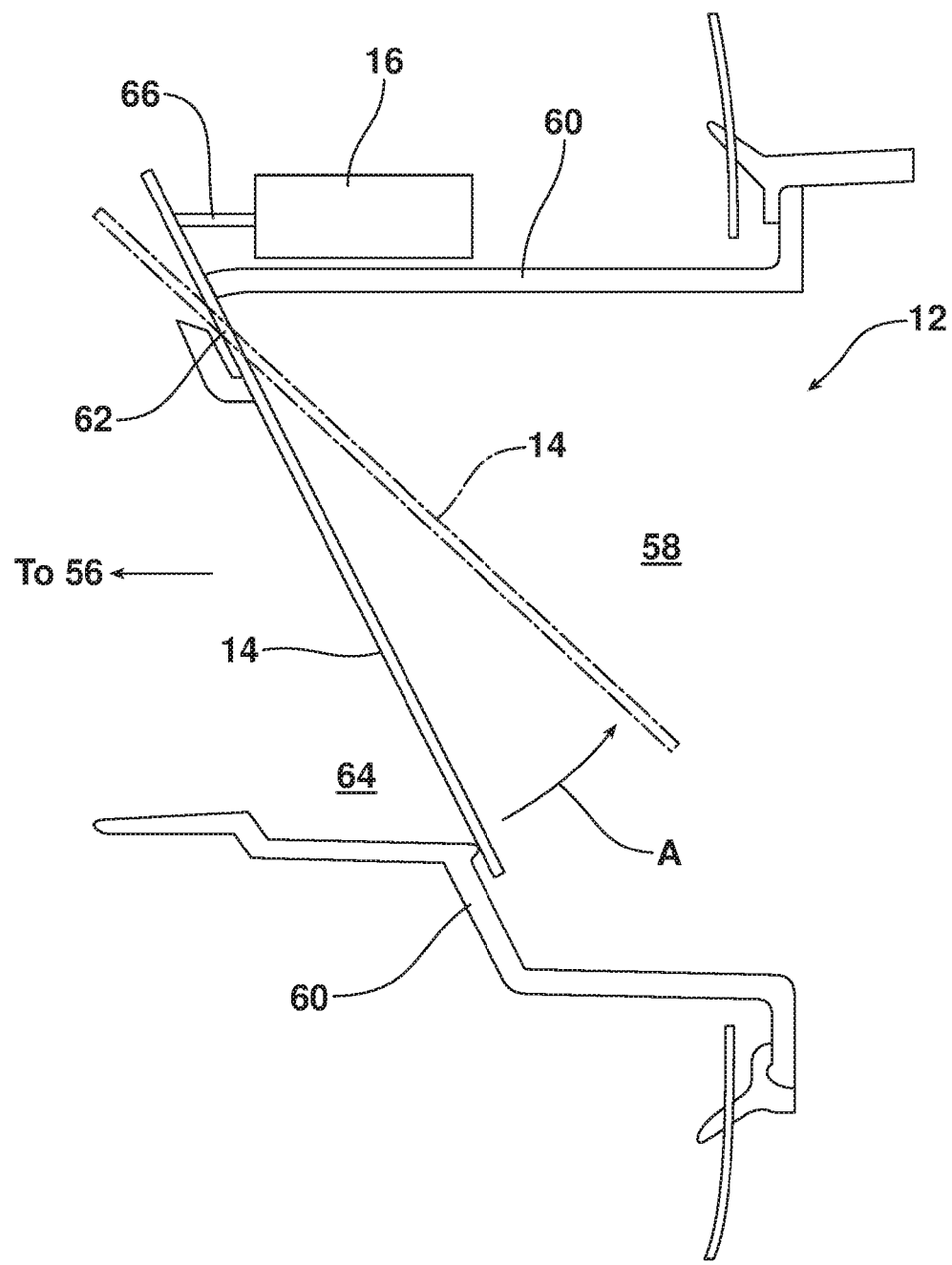
FIG. 3 is a schematic illustration of the air extractor and actuator operating in a passive mode to relieve positive air pressure from the passenger compartment of the motor vehicle.
Figure 4:
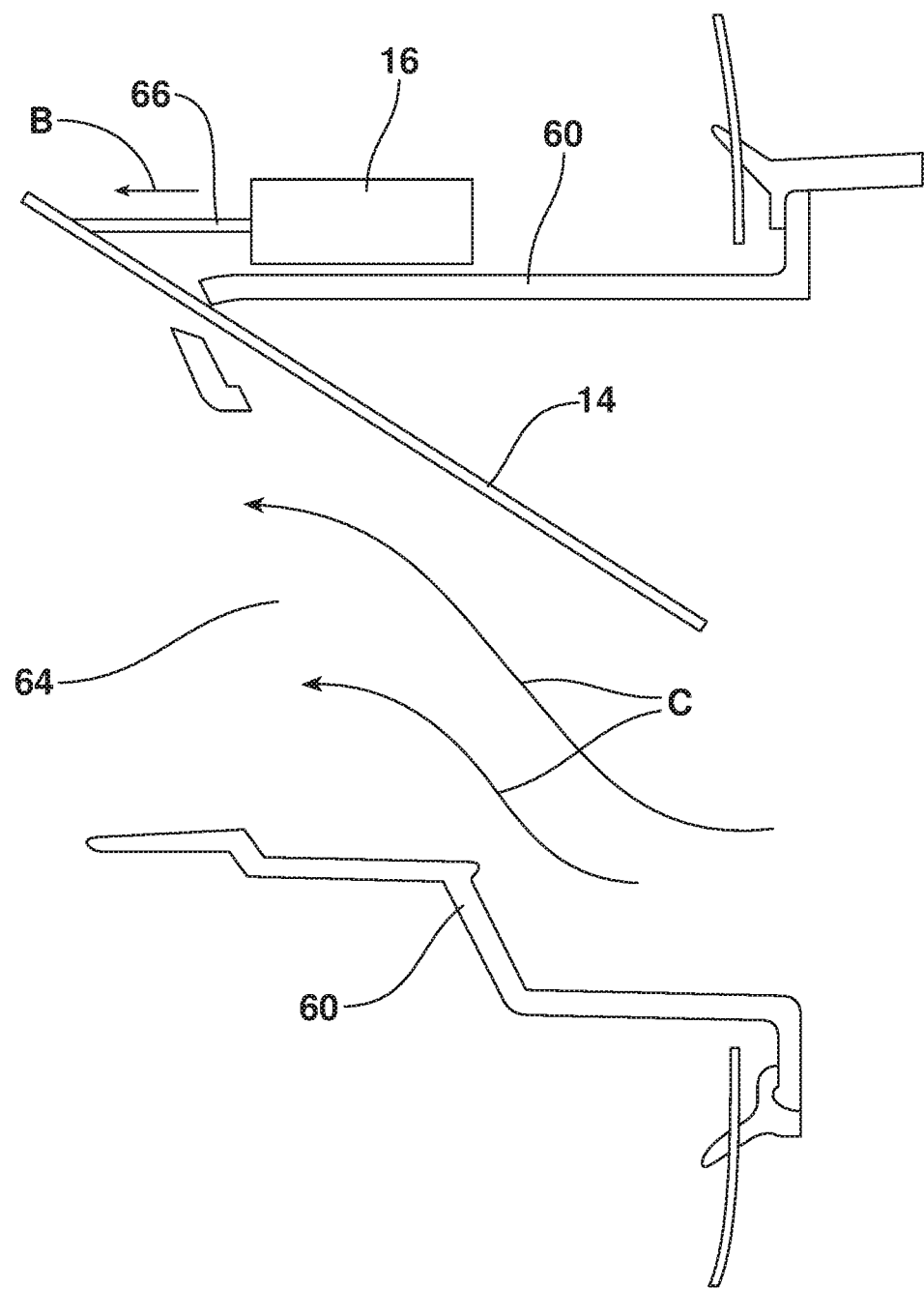
FIG. 4 is a schematic illustration of the air extractor operating in active mode to relieve negative air pressure from the passenger compartment of the motor vehicle.

Reference is now made to FIGS. 3 and 4 which illustrate, respectively, operation of the air extractor 12 in the passive mode and the active mode. As illustrated, the air extractor 12 includes a support frame 60. In the illustrated embodiment the air flow control valve 14 comprises a flap that is pivotally connected to the frame 60 at the hinge or pivot point 62. The air flow control valve or flap 14 is readily displaceable between a closed position illustrated in full line in FIG. 3 wherein the flap is seated against the frame 60 and closes the vent passageway 64 and an open position illustrated in phantom line wherein the vent passageway is opened (note action arrow A) to allow air flow and equalization of pressure between the passenger compartment 56 on one side of the air extractor 12 and the ambient environment 58 on the other.

As illustrated, the actuator 16 may comprise a linear actuator such as a solenoid that may be carried on the frame 60 above the pivot point 62. The actuator 16 includes an arm 66. When the actuator is deactivated, the arm 66 provides the necessary clearance from the air flow control valve/flap 14 to allow the flap to rest, under the pull of gravity, in the seated or closed position (see full line position). In contrast, as illustrated in FIG. 4, when the actuator 16 is activated, that arm 66 is extended (note action arrow B) so as to engage the air flow control valve/flap 14 and push the flap to the open position allowing air flow (note action arrows C) through the vent passageway 64.

During passive operation illustrated in FIG. 3, the air flow control valve or flap 14 remains in the seated position closing the vent passageway 64 so as to prevent noise intrusion and any drafts through the air extractor system at all times except when there is a positive pressure spike in the interior or passenger compartment 56 of a motor vehicle M. Such a positive pressure spike may occur, for example, when an open door of the motor vehicle M is being closed and the other doors and moon roof of the motor vehicle are already closed. In such a situation, the increase in the passenger compartment air pressure 56 forces the air flow control or flap 14 to pivot passively into the open position (see phantom line positions of flap 14) allowing the equalization of the pressure between the passenger compartment 56 and the ambient environment 58. This equalization of pressure relieves the effort required to close the door. As should be appreciated, in this passive mode of operation, the actuator 16 plays no part in the operation of the air flow control valve 14.

Reference is now made to FIG. 4 which illustrates how the air extraction system 10 mitigates the vacuum-effect otherwise created in a passenger compartment or cabin 56 of the motor vehicle M when one of the closures or doors of the vehicle is opened. More specifically, when one of the motor vehicle doors is opened, a door ajar switch, the electronic latch control module or the electronic actuator for opening and closing the door sends a signal via the associated data line 32, 36, 40 or 44 to the associated data input 20, 22, 24 or 26 of the controller 18 indicating the opening of one of the doors. In response, the controller 18 activates the actuator 16 which extends the arm 66 to engage the air flow control valve or flap 14 and push the flap into the open position as illustrated in FIG. 4. This opens the vent passageway 64 allowing air to travel inward in the direction of action arrow C from the ambient environment 58 into the passenger compartment 56 thereby relieving or mitigating the vacuum-effect in that compartment. In a motor vehicle M equipped with a moon roof, mitigation of the vacuum-effect advantageously limits or eliminates moon roof draw down that would otherwise be caused by the lowered air pressure in the passenger compartment 56 that is unable to support the moon roof against the overlying relatively higher pressure of the ambient environment. After a brief time delay of, for example, between 2 and 10 seconds, the controller 18 sends a signal to the actuator 16 deactivating the actuator and withdrawing the arm 66 thereby allowing the air flow control valve or flap 14 to return to the normal or closed position seated across and blocking the vent passageway 64.

From the above it is clear that the air extraction system 10 described herein is effective in a method of mitigating a vacuum-effect created in a passenger cabin or compartment 56 of a motor vehicle M when a motor vehicle closure such as a door is opened. That method includes opening an air extractor 12 to allow passage of air through the air extractor into the passenger cabin or compartment 56 as the motor vehicle closure is opened. Further that method may include sensing, by a first device or sensor 34, 38, 42, 46 the opening of the closure and opening, by a second device or actuator 16, an air flow control valve or flap 14 of the air extractor 12 to allow the passage of air from the ambient environment 58 into the passenger cabin 56. As a result, the method also includes eliminating draw down of a closed moon roof of the motor vehicle M that might otherwise result from that vacuum-effect.

As should be further appreciated, the air extraction system 10 is also effective in a method for mitigating air pressure throb (e.g., Helmholtz resonance) in a motor vehicle M when a closure such as a window or moon roof of the motor vehicle is opened and the motor vehicle is in motion. More specifically, that method includes opening an air flow control valve or flap 14 of the air extractor 12 to mitigate the passenger compartment or cabin pressure throb. Such a throb may be potentially produced any time a single closure such as a window or moon roof of the motor vehicle M is opened and the motor vehicle is in motion. More specifically, air pressure inside the passenger compartment 56 may have a tendency to rise and fall at a specific frequency depending on the speed of the motor vehicle.

In one possible embodiment, the controller 18 may also be configured to include a passenger cabin pressure data input 30 connected via data line 52 to a passenger compartment pressure sensor 54. In the event pressure throb is detected, the controller 18 provides a control signal to the actuator 16 causing the actuator to extend the arm 66 and open the air flow control valve or flap 14 to allow equalization of pressure between the passenger compartment 56 and the ambient environment 58. Thus the air pressure throb is effectively mitigated.

In another embodiment, the controller 18 monitors the closures including the moon roof and the windows of the motor vehicle M via appropriate sensors 34, 38, 42, 46 and if one of these is opened with the vehicle in operation, the controller 18 sends a signal to the actuator 16 causing the actuator to open the air flow control valve or flap 14 in an effort to actively equalize pressure between the ambient environment and the passenger compartment before the pressure throb develops.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An air extraction system for a motor vehicle, comprising:
    an air extractor including a support frame supporting an air flow control valve, said control valve configured to operate in a passive mode and an active mode;
    a linear actuator operatively connected to said air flow control valve; and
    a controller configured to activate said actuator and open said air flow control valve when a closure of said motor vehicle is opened thereby mitigating a vacuum-effect otherwise created in a passenger cabin of said motor vehicle.

2. The air extractor system of claim 1, wherein said air flow control valve is a flap displaceable between an opened position and a closed position.

3. The air extractor system of claim 1, wherein said controller is configured to include a data input respecting opened/closed status of said closure.

4. The air extractor system of claim 3, wherein said data input is connected to a door ajar switch associated with said closure.

5. The air extractor system of claim 3, wherein said data input is connected to an electronic latch control module associated with said closure.

6. The air extractor system of claim 3, wherein said data input is connected to an electronic actuator for opening and closing said closure.

7. The air extractor system of claim 3, wherein said controller is configured to include a second data input respecting opened/closed status of windows of said motor vehicle.

8. The air extractor system of claim 7, wherein said controller is configured to open said air flow control valve when only one window of said motor vehicle is open.

9. The air extractor system of claim 1, wherein said controller is configured to open said air flow control valve when a moon roof of said motor vehicle is closed and a closure of said motor vehicle is opened, thereby mitigating vacuum-effect in a passenger compartment of said motor vehicle and eliminating downward deflection of the moon roof.

10. The air extractor system of claim 1, wherein said controller is configured to open said air flow control valve when a moon roof of said motor vehicle is open and all other windows of said motor vehicle are closed.

11. An air extractor system for a motor vehicle, comprising:
    an air extractor including a support frame supporting an air flow control valve;
    a controller; and
    an actuator responsive to said controller to open said air flow control valve,
    wherein the controller is configured to operate the actuator such that said air flow control valve opens passively to release positive air pressure from a passenger compartment of said motor vehicle and opens actively by means of said actuator to mitigate negative air pressure in said passenger compartment of said motor vehicle.

12. A method for mitigating in-cabin air pressure throb in the motor vehicle when the closure of said motor vehicle is open and said motor vehicle is in motion by using the air extraction system of claim 1, comprising:

opening the air flow control valve of the air extractor of said motor vehicle to mitigate said in-cabin air pressure throb.

13. The method of claim 12 including sensing, by a sensor, when a single closure of said motor vehicle is open and opening, by the actuator, said air flow control valve in response.

14. The method of claim 12, including sensing, by a sensor, when a single window of said motor vehicle is open and opening, by the actuator, said air flow control valve in response.

15. The method of claim 12, including sensing, by a sensor, when a moon roof of said motor vehicle is open and windows of said motor vehicle are closed and opening, by the actuator, said air flow control valve in response.

16. The method of claim 12, including sensing by means of a sensor, pressure throb in a passenger cabin of the motor vehicle and opening, by the actuator, said air flow control valve in response.

* * * * *